(12) United States Patent
Epee

(10) Patent No.: US 10,431,972 B2
(45) Date of Patent: Oct. 1, 2019

(54) AUTO-MONITORING CIRCUIT AND CIRCUIT INTERRUPTER INCLUDING THE SAME

(71) Applicant: EATON CORPORATION, Cleveland, OH (US)

(72) Inventor: Victor Doualla Epee, Pittsburgh, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 305 days.

(21) Appl. No.: 15/413,861

(22) Filed: Jan. 24, 2017

(65) Prior Publication Data

US 2018/0212417 A1  Jul. 26, 2018

(51) Int. Cl.
*H02H 3/33* (2006.01)
*H02H 3/04* (2006.01)
*H01H 71/04* (2006.01)
*H01H 47/00* (2006.01)
*H01H 83/04* (2006.01)

(52) U.S. Cl.
CPC ........... *H02H 3/335* (2013.01); *H02H 3/044* (2013.01); *H02H 3/33* (2013.01); *H01H 47/002* (2013.01); *H01H 83/04* (2013.01); *H01H 2071/044* (2013.01); *H02H 3/338* (2013.01)

(58) Field of Classification Search
USPC ...................................... 361/42–50
See application file for complete search history.

(56) References Cited

U.S. PATENT DOCUMENTS

| 9,147,548 B2 * | 9/2015 | Bonasia ................. H01H 83/04 |
| 2007/0165342 A1 * | 7/2007 | Elms ....................... H02H 3/05 |
| | | 361/42 |
| 2017/0149235 A1 * | 5/2017 | Cui ........................ H02H 3/338 |

* cited by examiner

*Primary Examiner* — Danny Nguyen
(74) *Attorney, Agent, or Firm* — Eckert Seamans Cherin & Mellott, LLC

(57) ABSTRACT

An auto-monitoring circuit including a first input structured to receive a signal from a processor of a circuit interrupter, a second input structured to receive power from a circuit protected by the circuit interrupter, a first switch structured to remain closed while the signal is received at the first input and remains above a predetermined threshold level and to open when the signal ceases to be received at the first input or drops below the predetermined threshold level, a second switch structured to remain open while the first switch is closed and to close when the first switch opens, and an output electrically connected to a trip circuit of the circuit interrupter. Closing the second switch causes a trip signal to be output to the trip circuit that causes the trip circuit to trip open the separable contacts.

20 Claims, 2 Drawing Sheets

AUTO-MONITORING CIRCUIT AND CIRCUIT INTERRUPTER INCLUDING THE SAME

BACKGROUND

Field

The disclosed concept relates to circuit and, in particular, to circuit for use in circuit interrupter. The disclosed concept also related to circuit interrupters.

Background Information

Circuit interrupters are typically used to protect electrical circuitry from damage due to a fault condition such as an arc fault or a ground fault. Circuit interrupters typically include separable contacts that separate to open the circuit the circuit interrupt is protecting. Some types of circuit interrupters includes an electronic trip unit.

An electronic trip unit receives inputs from one or more sensors that sense characteristics of the circuit (e.g., current, temperature, etc.). The electronic trip unit includes a processor that analyzes the inputs from the sensors to determine whether a fault condition is present. The electronic trip unit also determines if and when to output a trip signal in response to detecting a fault in order to cause the separable contacts to trip open. A power supply in the circuit interrupter uses power from the protected circuit to power components of the electronic trip unit, such as the processor.

The electronic trip unit relies on its processor to determine whether a fault condition is present and to output the trip signal. If the processor is not operating properly, faults in the protected circuit can go undetected and could result in damage to the protected circuit or loads connected to it. For example, if the power supply stops supplying power to processor and other components of the electronic trip unit, the processor will stop operating properly and will not be able to detect whether faults are present on the protected circuit. Similarly, if the processor fails due to other causes, it will stop operating properly and will not be able to detect whether faults are present on the protected circuit.

There is room for improvement in circuits for use in circuit interrupters.

There is also room for improvement in circuit interrupters.

SUMMARY

These needs and others are met by embodiments of the disclosed concept in which an auto-monitoring trip unit is able to monitor a signal indicating that the processor of an electronic trip unit is operating normally and to initiate a trip when the signal ceases to be output or drops below a threshold level. These needs and others are also met by embodiments of the disclosed concept in which a circuit interrupter includes the auto-monitoring circuit.

In accordance with aspects of the disclosed concept, an auto-monitoring circuit for use in a circuit interrupter comprises: a first input structured to receive a signal from a processor of an electronic trip unit of the circuit interrupter; a second input structured to receive power from a circuit protected by the circuit interrupter; a first switch structured to remain closed while the signal is received at the first input and remains above a predetermined threshold level and to open when the signal ceases to be received at the first input or drops below the predetermined threshold level; a second switch structured to remain open while the first switch is closed and to close when the first switch opens; and an output electrically connected to a trip circuit of the circuit interrupter, wherein closing the second switch causes a trip signal to be output to the trip circuit that causes the trip circuit to trip open the separable contacts.

In accordance with other aspects of the disclosed concept, a circuit interrupter for protecting a circuit comprises: a power supply structured to generate direct current power using alternating current power flowing through the circuit; separable contacts structured to trip open to interrupt power flowing through the circuit; a trip circuit structured to trip open the separable contacts; an electronic trip unit including a processor structured to output a first trip signal in response to detecting a fault to cause the trip circuit to cause the separable contacts to trip open, and wherein the processor is structured to output a signal when operating normally; and an auto-monitoring circuit structured to output a second trip signal in response to the processor ceasing to output the signal, or the signal dropping below a predetermined threshold level, to cause the trip circuit to trip open the separable contacts.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
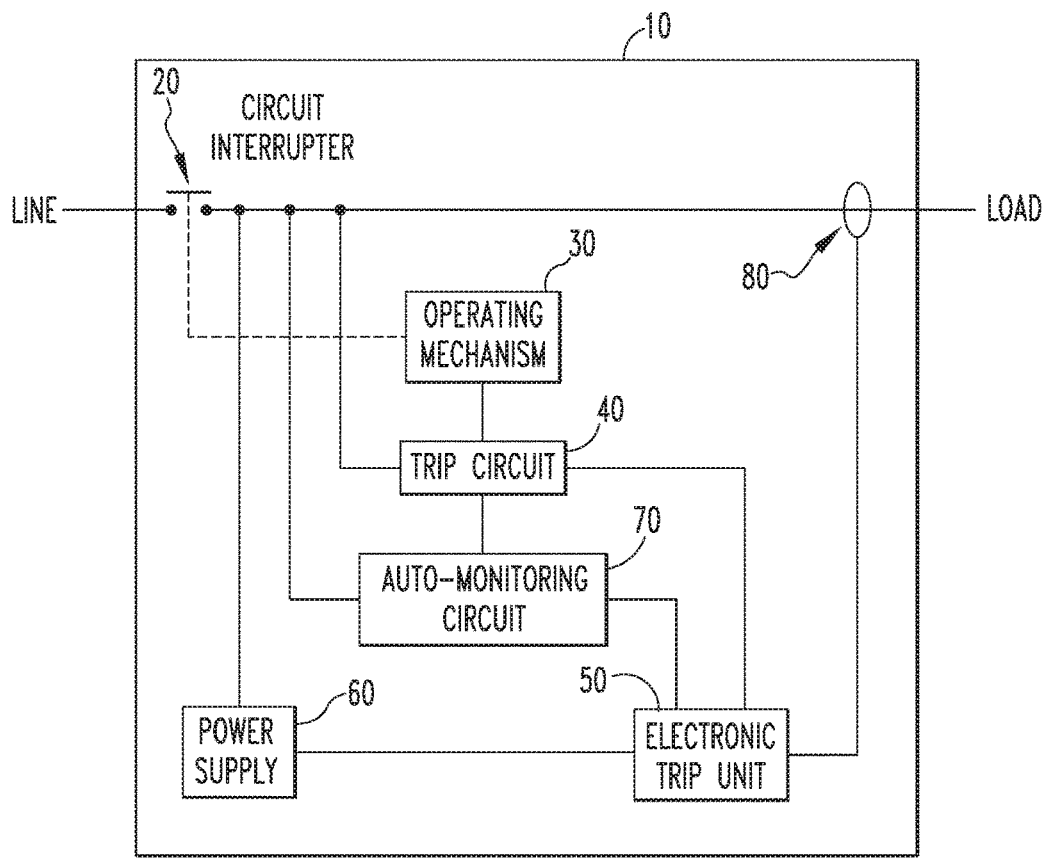
FIG. 1 is a block diagram in schematic form of a circuit interrupter in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "processor" shall mean a programmable analog and/or digital device that can store, retrieve and process data; a controller; a control circuit; a computer; a workstation; a personal computer; a microprocessor; a microcontroller; a microcomputer; a central processing unit; a mainframe computer; a mini-computer; a server; a networked processor; or any suitable processing device or apparatus.

Figure 2:
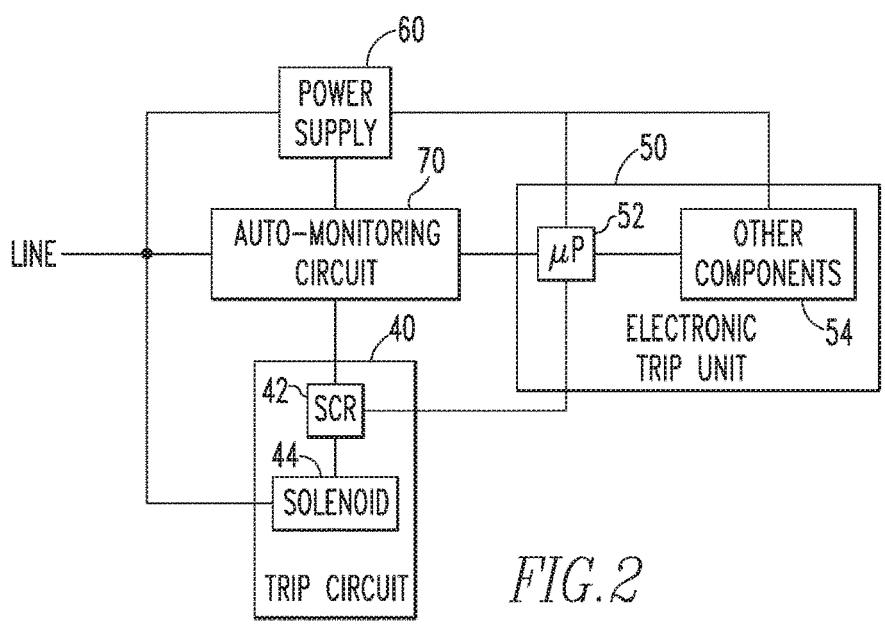
FIG. 2 is a block diagram in schematic form showing some of the components of the circuit interrupter of FIG. 1 is more detail.

FIG. 1 is a block diagram in schematic form of a circuit interrupter 10 (e.g., without limitation, a circuit breaker, ground fault circuit interrupter, etc.) in accordance with an example embodiment of the disclosed concept and FIG. 2 is a block diagram of selected elements of the circuit interrupter 10 shown in more detail. The circuit interrupter 10 is electrically connected on a protected circuit between a power source (not shown) and a load (not shown). The circuit interrupter 10 receives power from the power source via a LINE input and provides it to the load via a LOAD output.

The circuit interrupter 10 includes separable contacts 20 that are structured to open and close. Opening the separable contacts 20 opens the circuit and interrupts power from flowing through the circuit from the power source to the load. In some example embodiments of the disclosed concept, the circuit interrupter 10 also includes an operating mechanism 30. The operating mechanism 30 is structured to trip open the separable contacts 20. The operating mechanism 30 may include, for example and without limitation, a trip bar, lever arm, or other mechanical elements that are operated to trip open the separable contacts 20.

The circuit interrupter 10 also includes a trip circuit 40. The trip circuit 40 includes electrical elements that can cause the circuit interrupter 10 to trip open the separable contacts 20 in response to receiving an electrical signal such as a trip signal. In some example embodiments of the disclosed concept, the trip circuit 40 may include a silicon controller rectifier (SCR) 42 and a solenoid 44 (shown in FIG. 2). Applying a trip signal to the gate of the SCR 42 allows power to flow through the solenoid 44 which causes the solenoid 44 to actuate and initiate tripping open of the separable contacts 20. In some example embodiments of the disclosed concept, the solenoid 44 may interact with the operating mechanism 30 which in turn trips open the separable contacts 20. Alternatively, in some example embodiments of the disclosed concept, the solenoid 44 itself trips open the separable contacts 20 and the operating mechanism 30 may be omitted.

The circuit interrupter 10 also includes and electronic trip unit 50. The electronic trip unit 50 is structured to receive inputs from one or more sensors (e.g., without limitation, a current sensor 80) and to detect a fault (e.g., without limitation, overcurrent, ground fault, arc fault, etc.) with the protected circuit. In response to detecting the fault, the electronic trip unit 50 is structured to output a trip signal to the trip circuit 40 which causes the trip circuit 40 to initiate and trip that causes the separable contacts 20 to trip open.

The electronic trip unit 50 includes a processor 52 and other components 54 (shown in FIG. 2). The processor 52 and other components 54. In order for the electronic trip unit 50 to operate normally (i.e., to detect faults and output a trip signal), the processor 52 must be powered on. The processor may also have an associated memory (not shown). The processor 52 may be, for example and without limitation, a microprocessor, a microcontroller, or some other suitable processing device or circuitry, that interfaces with the memory or another suitable memory. The memory may be any of one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The memory may store one or more routines which, when executed by the processor 52, cause the processor 52 to implement at least some of its functionality.

The other components 54 of the electronic trip unit 50 may include other electrical elements of the electronic trip unit 50 such as electrical elements included on a printed circuit board.

The circuit interrupter 10 further includes a power supply 60. The power supply 60 is structured to generate direct current power by using alternating current power flowing through the protected circuit. The power supply 60 is structured to provide the direct current power to the electronic trip unit 50 to power elements of the electronic trip unit 50 such as the processor 52.

The circuit interrupter 10 additionally includes an auto-monitoring circuit 70. When the electronic trip unit 50 is operating normally, the processor 52 outputs a signal (e.g., provide a voltage) to the auto-monitoring circuit 70. The auto-monitoring circuit 70 is also structured to receive power from the protected circuit. The auto-monitoring circuit 70 is also electrically connected to the trip circuit 40. While the auto-monitoring circuit 70 receives the signal output by the processor 52, the auto-monitoring circuit 70 is inactive. However, when the processor 52 ceases to output the signal, or the signal drops below a predetermined threshold level, the auto-monitoring circuit 70 outputs a trip signal to the trip circuit 40 which causes the trip circuit 40 to initiate a trip to cause the separable contacts 20 to trip open.

The processor 52 will output the signal when operating normally, so when the processor 52 ceases to output the signal, or the signal drops below the predetermined threshold level, it is indicative of the processor 52 not operating normally and possibly no longer being capable of detecting faults and/or outputting a trip signal to clear a fault. In this case, the auto-monitoring circuit 70 outputs its own trip signal that initiates a trip thus preventing the protected circuit from being unprotected due to a failing processor 52. Moreover, the auto-monitoring circuit 70 is structured to use power directly from the protected circuit, rather than the power supply 60 to generate its trip signal, so the auto-monitoring circuit 70 will not fail due to a failure of the power supply 60.

Figure 3:
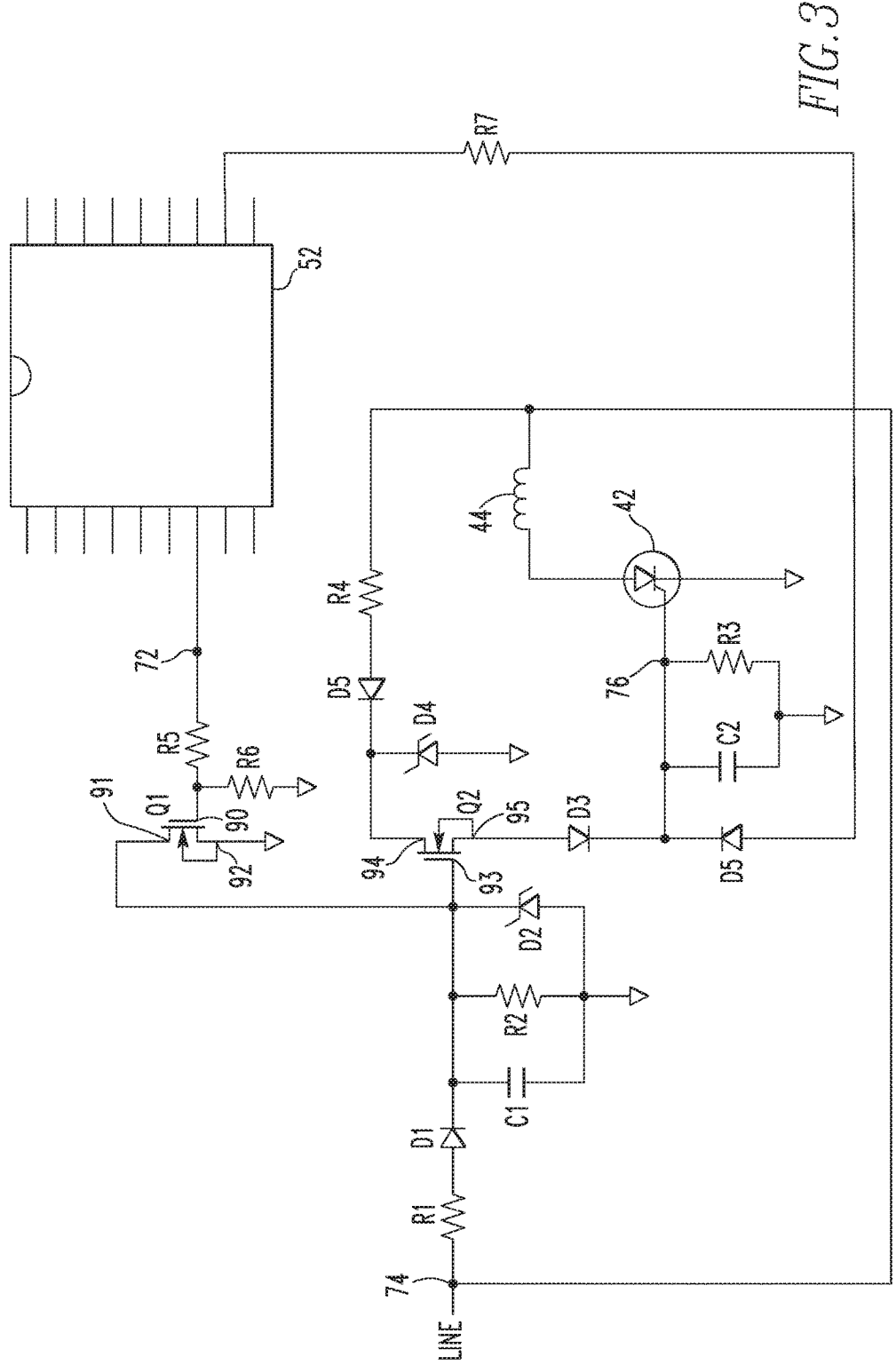
FIG. 3 is a circuit diagram of an auto-monitoring circuit in accordance with an example embodiment of the disclosed concept.

FIG. 3 is a circuit diagram of the auto-monitoring circuit 70 in accordance with an example embodiment of the disclosed concept. The auto-monitoring circuit 70 includes a first input 72, a second input 74, and an output 76. The first input 72 is electrically connected to the processor 52 and is structured to receive the signal output by the processor 52. The second input 74 is electrically connected to the protected circuit (e.g., LINE input) and is structured to receive power from the protected circuit. The output 76 is electrically connected to the trip circuit 40 and, in particular, to the gate of the SCR 42.

The auto-monitoring circuit 70 also includes a first switch Q1 and a second switch Q2. In some example embodiments of the disclosed concept, the first and second switches Q1,Q2 are transistors (e.g., without limitation, MOSFETs). The first switch Q1 includes a gate 90, a drain 91, and a source 92. The second switch Q2 also includes a gate 93, a drain 94, and a source 95. The first switch Q1 is structured to remain closed while the signal is received at the first input 72 and to open when the signal ceases to be received, or drops below a predetermined threshold level, at the first input 72. The second switch Q2 is structured to remain open while the first switch Q1 is closed and to close when the first switch Q1 opens. Closing the second switch Q2 causes a trip signal to be output to the trip circuit 40 that causes the trip circuit to cause separable contacts of the circuit interrupter to trip open.

The gate 90 of the first switch Q1 is electrically coupled to the first input 72 and receives the signal output by the processor 52. The source 92 of the first switch Q1 is electrically connected to ground and the drain 91 of the first switch Q1 is electrically connected to the gate 93 of the second switch Q2. The first switch Q1 remains closed while the signal is applied to its gate 90 and opens when the signal is no longer received at its gate 90 or the signal drops below a threshold level. The gate 93 of the second switch Q2 is also electrically coupled to the second input 74 and receives power from the protected circuit via the second input 74. The source 95 of the second switch Q2 is electrically coupled to output 76 and the drain 94 of the second switch Q2 is electrically coupled to the second input 74 and receives power from the protected circuit. When the first switch Q1 is closed (i.e., the processor 52 ceases to output the signal or the signal drops below a predetermined threshold level), the gate 93 of the second switch Q2 is pulled to ground causing the second switch Q2 to remain open. When the first switch Q1 is opened, power from the protected circuit is provided to the gate 93 of the second switch Q2 causing the second switch Q2 to close. When the second switch Q2 closes, power from the circuit is provided to the trip circuit via the drain and source of the second switch. Resistor R5 may be electrically coupled between the input 72 and the gate 90 of the first switch Q1 to allow the first switch Q1 to bias and turn on the first switch Q1.

The auto-monitoring circuit 70 further includes a rectifier electrically coupled between the second input 74 and the gate 93 of the second switch Q1. The rectifier is a half-wave rectifier formed from diode D1. However, it will be appreciated that other types of rectifiers may be employed without departing from the scope of the disclosed concept. Resistor R1 may also be electrically coupled between the second input 74 and diode D1.

The auto-monitoring circuit 70 additionally includes an RC circuit electrically coupled between the gate 93 of the second switch Q2 and ground. The RC circuit causes a delay between the opening of the first switch Q1 and the closing of the second switch Q2. The RC circuit includes capacitor C1 and resistor R2 electrically connected in parallel with each other. When the first switch Q1 switch opens, power provided through the first input 74 begins charging capacitor C1. Once capacitor C1 is charged to the gate-source threshold voltage of the second switch Q2, the second switch Q2 closes. The time constant of the RC circuit determines the delay between the first switch opening Q1 and the second switch Q2 closing. The time constant may be selected so that there is a predetermined delay between the first switch opening Q1 and the second switch Q2 closing. The predetermined delay can be used to avoid nuisance tripping that could be caused by, for example and without limitation, random voltage dips.

The auto-monitoring circuit 70 also includes some diodes that provide protection for the first and second switches Q1,Q2. For example, diode D2 is electrically coupled between the gate 93 of the second switch Q2 and ground. In some example embodiments of the disclosed concept, diode D2 is a zener diode. Diode D2 has a breakdown voltage that is less than a maximum gate-source voltage of the second switch Q2. As such, the gate-source voltage of the second switch Q2 cannot exceed its maximum gate-source voltage. Diode D4 is electrically coupled between the drain 94 of the second switch Q2 and ground. In some example embodiments of the disclosed concept, diode D4 is a zener diode. Diode D4 has a breakdown voltage that is less than a maximum drain-source voltage of the second switch Q2. As such, the drain-source voltage of the second switch Q2 cannot exceed its maximum drain-source voltage. Diode D5 is electrically coupled between the second input 74 and the drain 94 of the second switch. Diode D5 ensures that the drain-source voltage of the second switch Q2 remains positive. Resistor R4 may be electrically connected in series with diode D5. Resistor R4 controls the amount of current needed to trigger the gate 93 of the SCR 42 when the second switch Q2 is closed. Additionally, resistor R4 limits the amount of current drawn by diode D5 when the second switch Q2 is opened.

Diode D3 is electrically coupled between the source 95 of the second switch Q2 and the output 76. The processor 52 is also electrically connected to the output 76 and the processor's 52 trip signal is provided to the output 76. The diode D3 is arranged so that the processor's 52 trip signal can be provided to the gate of the SCR 42 but is blocked from interfering with the auto-monitoring circuit 70.

The auto-monitoring circuit 70 additionally includes a filtering circuit electrically connected between the output 76 and ground. The filtering circuit includes capacitor C2 and resistor R3. Capacitor C2 and resistor R3 filter electrical noise at the output 76. Unwanted electrical noise could potentially trigger the SCR 42 and initiate a trip.

The auto-monitoring circuit 70 further includes resistors R6 and R7. Resistor R6 is electrically connected between the gate of the first switch Q1 and ground. Resistor R6 is a pull-down resistor that ensures that the gate of the first switch Q1 is not floating when power is not applied by the processor 52 at the first input 72. Resistor R7 is electrically connected between the processor 52 and diode D5. Resistor R7 is structured to limit the trip signal current through the SCR's 42 gate.

The auto-monitoring circuit 70 is capable of initiating a trip when the processor 52 stops outputting the signal that indicates it is operating normally. The auto-monitoring circuit 70 also does not rely on the power supply 60. Both the auto-monitoring circuit 70 and the processor 52 can independently output trip signals to initiate a trip. The processor's 52 trip signal does not interfere with operations of the auto-monitoring circuit 70 and, likewise, the auto-monitoring circuit's 70 trip signal does not interfere with the operations of the processor 52.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An auto-monitoring circuit for use in a circuit interrupter, the auto-monitoring circuit comprising:
    a first input structured to receive a signal from a processor of an electronic trip unit of the circuit interrupter;
    a second input structured to receive power from a circuit protected by the circuit interrupter;
    a first switch structured to remain closed while the signal is received at the first input and remains above a predetermined threshold level and to open when the signal ceases to be received at the first input or drops below the predetermined threshold level;
    a second switch structured to remain open while the first switch is closed and to close when the first switch opens; and
    an output electrically connected to a trip circuit of the circuit interrupter,
    wherein closing the second switch causes a trip signal to be output to the trip circuit that causes the trip circuit to open separable contacts of the circuit interrupter.

2. The auto-monitoring circuit of claim 1, wherein the first and second switches are transistors each having a gate, a drain, and a source; and wherein the gate of the first switch is electrically coupled to the first input so as to receive the signal from the first input, the source of the first switch is electrically connected to ground, and the drain of the first switch is electrically connected to the gate of the second switch.

3. The auto-monitoring circuit of claim 2, wherein the gate of the second switch is electrically coupled to the second input so as to receive power from the circuit; and wherein the source of the second switch is electrically coupled to output, and the drain of the second switch is electrically coupled to the second input so as to receive power from the circuit.

4. The auto-monitoring circuit of claim 3, wherein when the first switch is closed, the gate of the second switch is pulled to ground causing the second switch to remain open; and wherein when the first switch is open, power from the circuit is provided to the gate of the second switch causing the second switch to close.

5. The auto-monitoring circuit of claim 3, wherein when the second switch closes, power from the circuit is provided to the trip circuit via the drain and source of the second switch.

6. The auto-monitoring circuit of claim 3, further comprising:
   a rectifier coupled between the second input and the gate of the second switch.

7. The auto-monitoring circuit of claim 6, wherein the rectifier is a half-wave rectifier.

8. The auto-monitoring circuit of claim 3, further comprising:
   an RC circuit electrically coupled between the gate of the second switch and ground, the RC circuit including:
      a capacitor electrically coupled between the gate of the second switch and ground; and
      a resistor electrically coupled between the gate of the second switch and ground and being electrically coupled in parallel with the capacitor.

9. The auto-monitoring circuit of claim 3, further comprising:
   a zener diode electrically coupled between the gate of the second switch and ground and having a breakdown voltage that is less than a maximum gate-source voltage of the second switch.

10. The auto-monitoring circuit of claim 3, further comprising:
    a zener diode electrically coupled between the drain of the second switch and ground and having a breakdown voltage that is less than a maximum drain-source voltage of the second switch.

11. The auto-monitoring circuit of claim 3, further comprising:
    a resistor electrically coupled between the second input and the drain of the second switch; and
    a diode electrically coupled between the second input and the drain of the second switch,
    wherein the resistor and the diode are electrically coupled in series.

12. The auto-monitoring circuit of claim 3, further comprising:
    a diode electrically coupled between the source of the second switch and the output.

13. The auto-monitoring circuit of claim 3, further comprising:
    a resistor electrically coupled between the first input and the gate of the first switch.

14. The auto-monitoring circuit of claim 1, further comprising:
    a filtering circuit electrically coupled between the output and ground, the filtering circuit including:
       a capacitor electrically coupled between the output and ground; and
       a resistor electrically coupled between the output and ground and being electrically coupled in parallel with the capacitor.

15. A circuit interrupter for protecting a circuit, the circuit interrupter comprising:
    a power supply structured to generate direct current power using alternating current power flowing through the circuit;
    separable contacts structured to trip open to interrupt power flowing through the circuit;
    a trip circuit structured to trip open the separable contacts;
    an electronic trip unit including a processor structured to output a first trip signal in response to detecting a fault to cause the trip circuit to cause the separable contacts to trip open, and wherein the processor is structured to output a signal when operating normally; and
    an auto-monitoring circuit structured to output a second trip signal in response to the processor ceasing to output the signal, or the signal dropping below a predetermined threshold level, to cause the trip circuit to trip open the separable contacts,
    wherein the auto-monitoring circuit comprises:
       a first input structured to receive the signal from the processing unit;
       a second input structured to receive power from the circuit;
       a first switch structured to remain closed while the signal is received at the first input and to open when the signal ceases to be received at the first input;
       a second switch structured to remain open while the first switch is closed and to close when the first switch opens; and
       an output electrically connected to the trip circuit,
       wherein closing the second switch causes the second trip signal to be output to the trip circuit.

16. The circuit interrupter of claim 15, wherein the first and second switches are transistors each having a gate, a drain, and a source; and wherein the gate of the first switch is electrically coupled to the first input so as to receive the signal from the first input, the source of the first switch is electrically connected to ground, and the drain of the first switch is electrically connected to the gate of the second switch.

17. The circuit interrupter of claim 16, wherein the gate of the second switch is electrically coupled to the second input so as to receive power from the circuit; and wherein the source of the second switch is electrically coupled to output, and the drain of the second switch is electrically coupled to the second input so as to receive power from the circuit.

18. The circuit interrupter of claim 17, wherein when the second switch closes, power from the circuit is provided to the trip circuit via the drain and source of the second switch.

19. The circuit interrupter of claim 17, further comprising:
    an RC circuit electrically coupled between the gate of the second switch and ground, the RC circuit including:
       a capacitor electrically coupled between the gate of the second switch and ground; and
       a resistor electrically coupled between the gate of the second switch and ground and being electrically coupled in parallel with the capacitor.

20. The circuit interrupter of claim 17, further comprising:
    a diode electrically coupled between the source of the second switch and the output, wherein the processing unit is structured to provide the second trip signal to the output, and
wherein the diode is structured to block the first trip signal from interfering with the auto-monitoring circuit.

* * * * *